United States Patent [19]
Alto et al.

[11] Patent Number: 5,499,894
[45] Date of Patent: Mar. 19, 1996

[54] KEYBOLT FASTENER

[75] Inventors: Scott E. Alto; Roger E. Alto, both of Greenwich; Frank C. Collister, Port Clinton, all of Ohio

[73] Assignee: Perma Manufacturing Inc., Greenwich, Ohio

[21] Appl. No.: 235,058

[22] Filed: Apr. 29, 1994

[51] Int. Cl.⁶ .................................................. F16B 21/00
[52] U.S. Cl. ................................................ 411/340; 411/345
[58] Field of Search ................................ 411/340, 344, 411/345, 346

[56] References Cited

U.S. PATENT DOCUMENTS

| | | | |
|---|---|---|---|
| 2,287,117 | 6/1942 | Montalto | 411/340 X |
| 2,360,395 | 10/1944 | Byron | 411/340 |
| 3,673,910 | 7/1972 | Collister | 411/345 |
| 3,861,267 | 1/1975 | Collister | 411/345 |
| 4,508,479 | 4/1985 | Mez | 411/340 |

Primary Examiner—Neill R. Wilson
Attorney, Agent, or Firm—Ralph E. Jocke; Michael C. Pophal

[57] ABSTRACT

A keybolt (40) includes a bolt member (10) and a key member (12). The key member includes a first leg (22) and a second leg (24) which are biased apart. The first leg includes steps (21) thereon. The key member is rotationally and slidably movable in a recess (20) on said bolt member. The key member is held in said recess by a rivet (14) which extends through elongated channels (42) in the leg members. The key member is movable between a locked position in which it extends generally traversely of the axis of the bolt member so as to hold the keybolt in an aperture through which it extends. The key member is movable to an unlocked position wherein it is rotatable to extend coaxially with the bolt member and wherein the keybolt may be readily installed or removed from appropriately sized apertures.

6 Claims, 6 Drawing Sheets

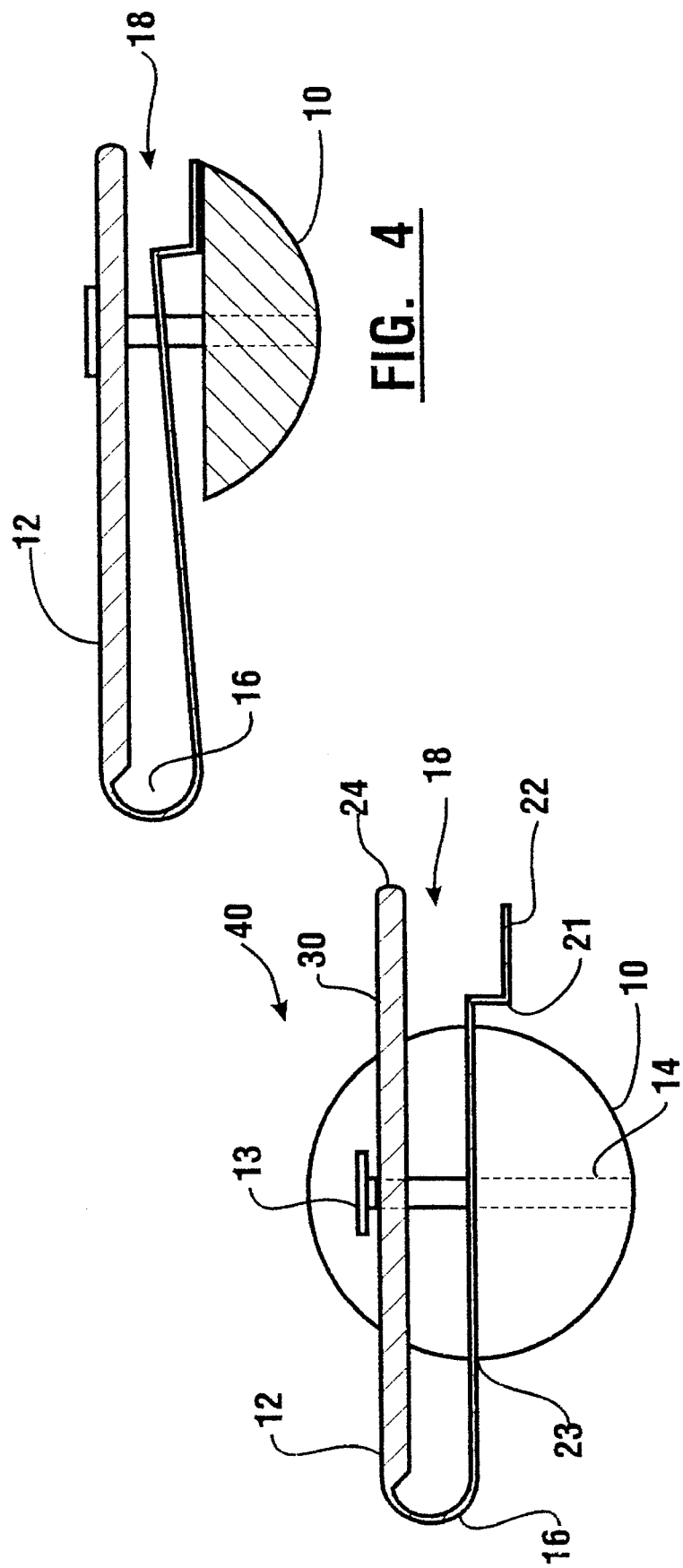

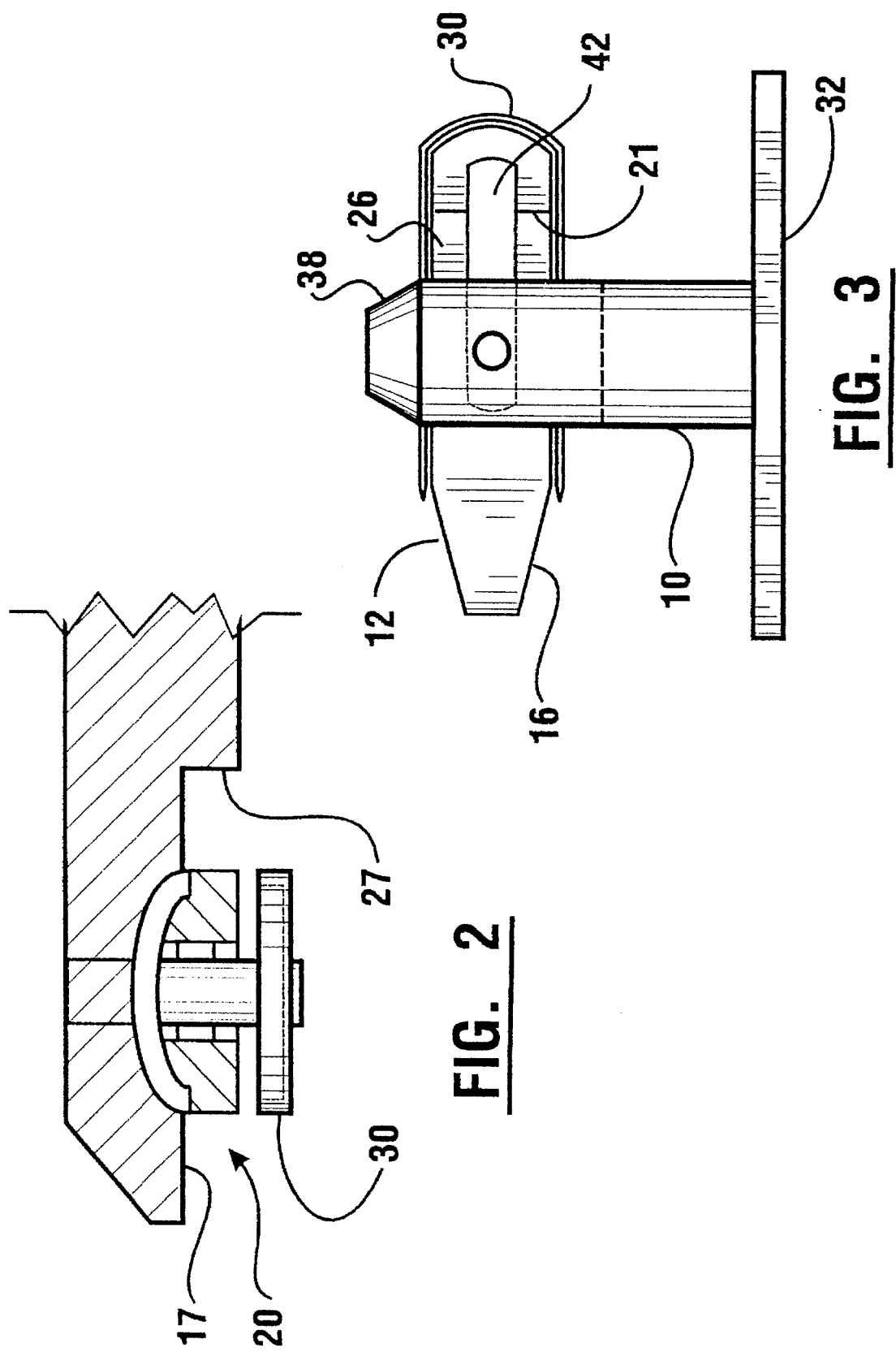

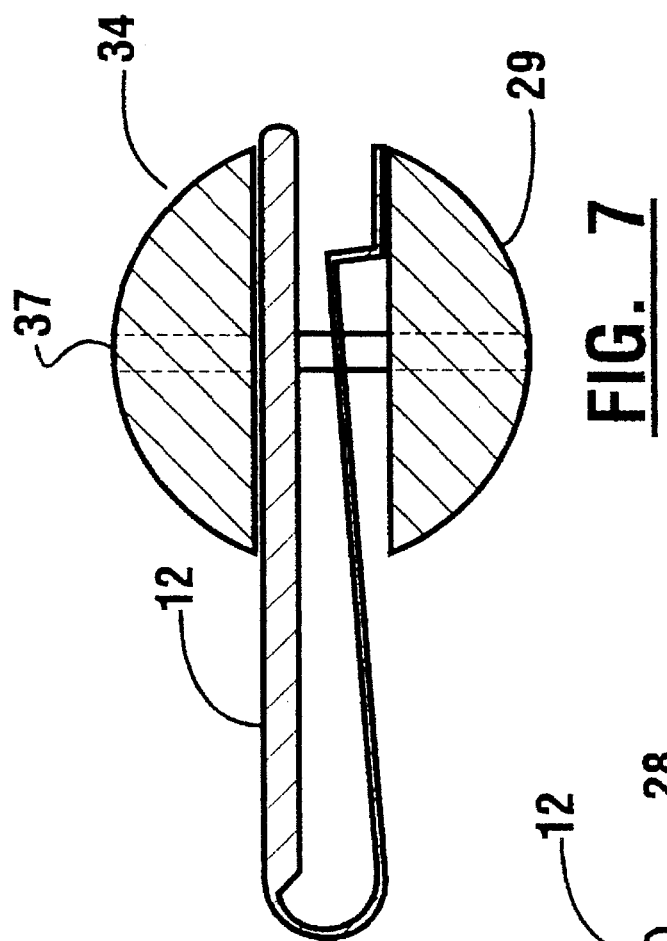
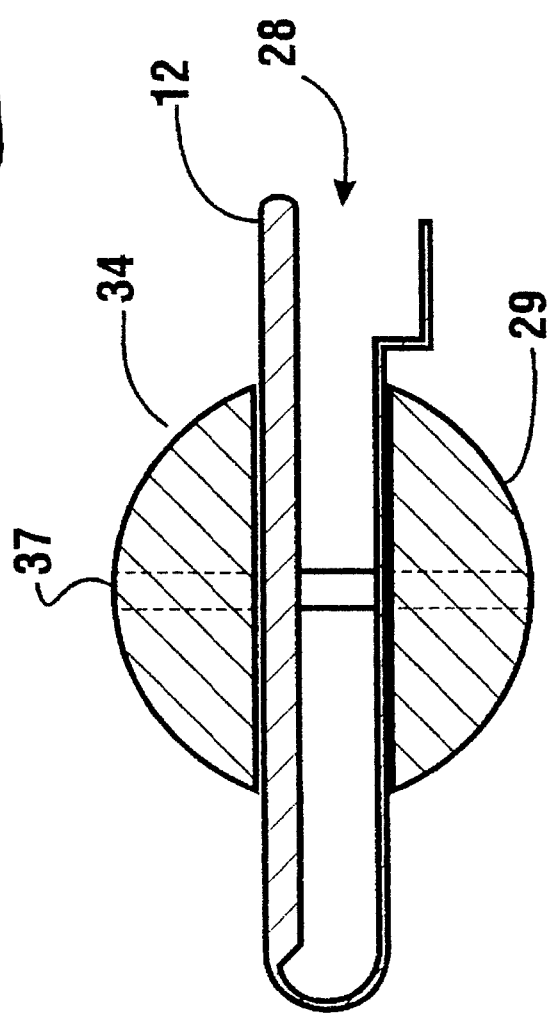

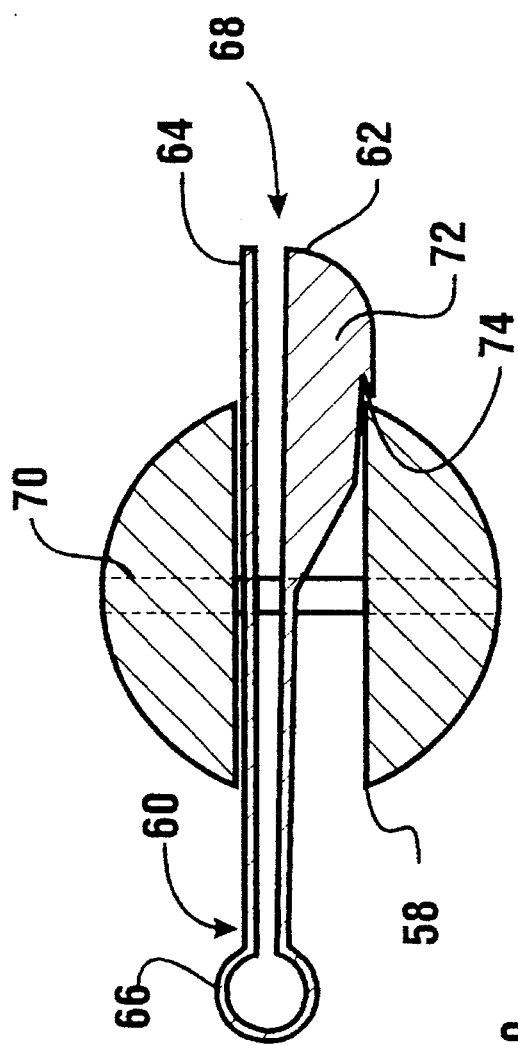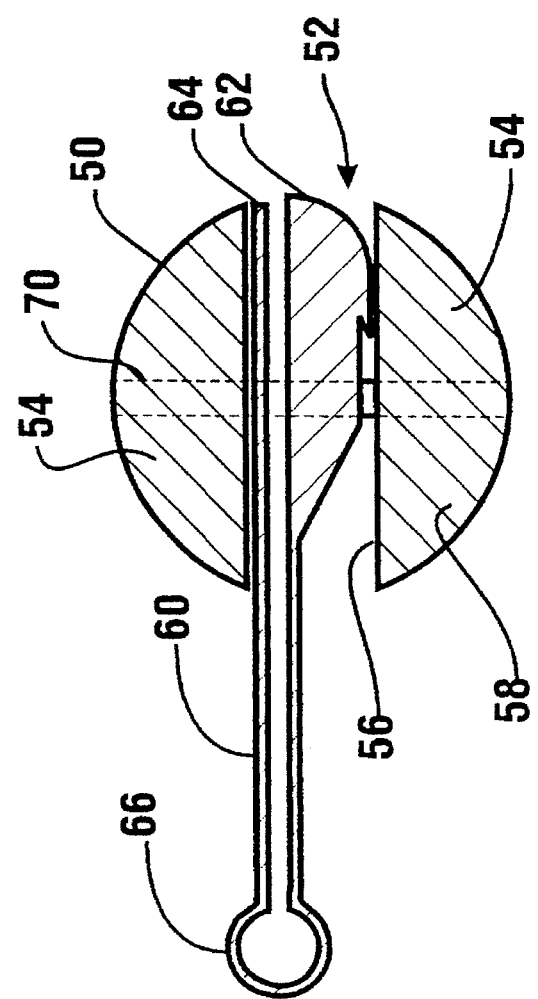

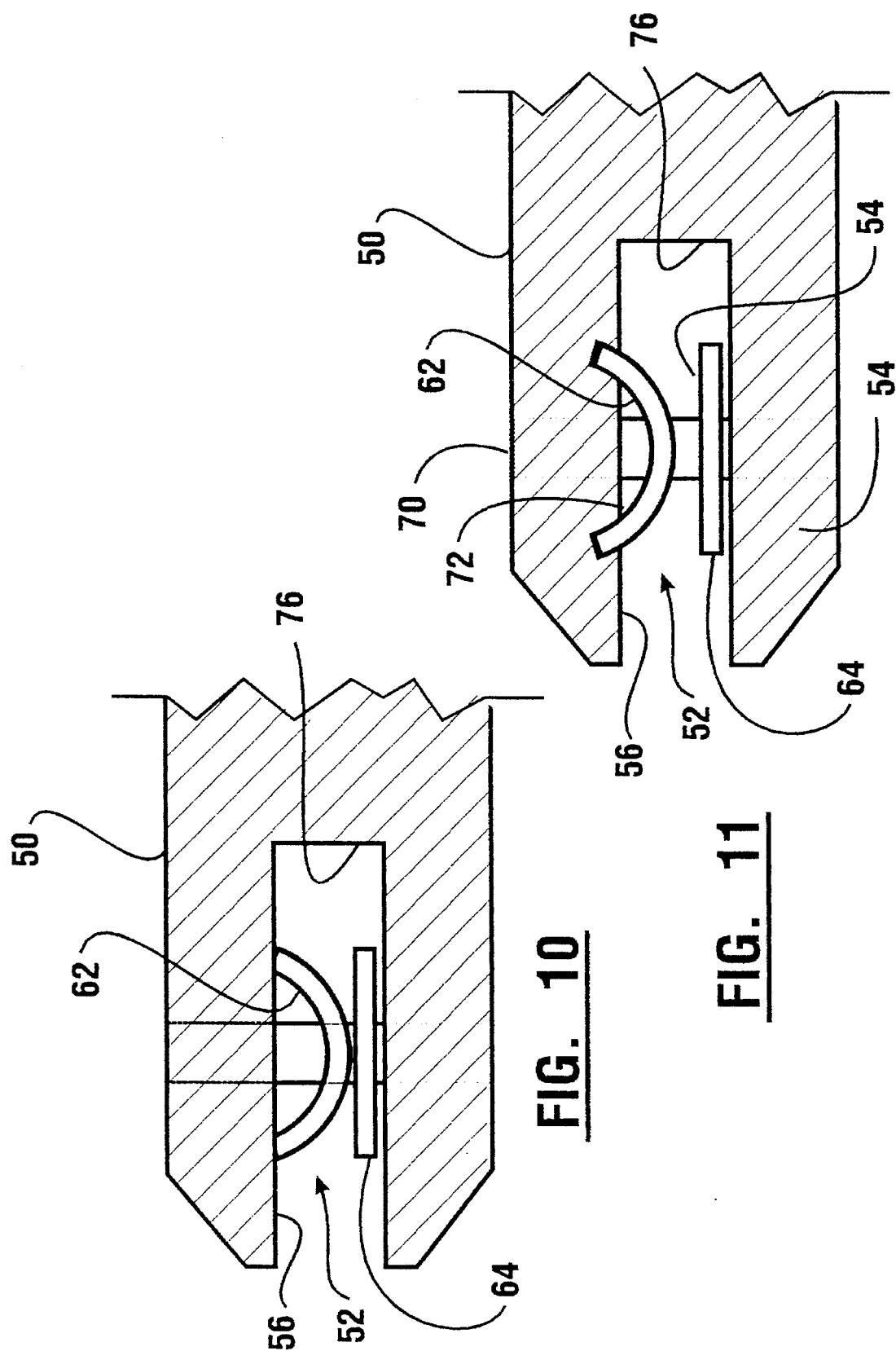

5,499,894

KEYBOLT FASTENER

TECHNICAL FIELD

This invention relates to keybolts. Specifically this invention relates to keybolts having means for locking the keybolt in a position fastening two members together.

BACKGROUND ART

Keybolts are used to temporarily fasten two members together. Usually, keybolts are used for fastening members in a manner that enables them to rotate relative to one another.

In fastening applications which use keybolts it is important that the keybolt remain in the fastening position while in use and that the accidental or unintentional removal of the keybolt from the fastening position be avoided. Therefore, it is desirable to have a keybolt possess a locking means which secures the keybolt in position, but which may be readily unlatched without use of tools or strenuous manual manipulation.

In the prior art connecting pins have been used to perform the function of keybolts. Often, these pins are used in conjunction with a cotter pin or hair pin to secure the pin in the apertures in the connected members through which the connecting pin extends. When such an assembly is subject to vibration, jarring, or impact the cotter pin or hair pin may become disengaged. This results in the connecting pin falling out and unfastening the members. Such prior art connecting pins also have the disadvantage that they include two separate pieces. Between operations of assembly and disassembly, one of the pieces, usually the smaller cotter or hair pin, becomes lost. This makes the connecting pin unsuitable for use until a replacement part is available.

Thus, there exists a need for keybolt which is a unitary assembly which avoids the loss of a cotter or hair pin, and which may be readily moved between a locking position for holding two members together and an unlocking position wherein the keybolt may be readily inserted and removed.

DISCLOSURE OF INVENTION

It is an object of the present invention to provide a keybolt that possess locking means for retaining the keybolt in a locked position.

It is a further object of the present invention to provide a keybolt which possesses a locking means which is manually releasable.

It is a further object of the present invention to provide a keybolt which is simple in instruction, inexpensive to produce, strong, and highly effective in operation.

It is a further object of the present invention to provide a keybolt which possesses a key member which is both movable, rotatable, and slidable on the bolt member and which enables the keybolt to be locked and unlocked without the use of tools or strenuous manual manipulation.

It is a further object of the present invention to provide a keybolt in which the key member is permanently attached to the bolt member.

Further objects of the invention will be made apparent in the following Best Modes for Carrying Out the Invention and the appended claims.

The foregoing objects are accomplished in the preferred embodiment of the invention by a keybolt which includes a bolt member. The bolt member may be generally S-shaped, dog-legged, or may include a head at one end thereof. The bolt member has a recess at a free end thereof.

An elongated U-shaped key member is slidable and rotatably mounted in the recess on the bolt member. The key member includes a pair of spaced legs. Each leg has an elongated channel therethrough. A rivet mounted on the bolt member extends through the channels in the legs of the key member. The rivet holds the key member to the bolt member but enables the key member to be both rotatably and longitudinally movable in the recess.

In the unlocked condition, the key member is movable to a position wherein it extends longitudinally in alignment with the central axis of the bolt member. This enables the free end of the keybolt be longitudinally extended through the apertures of two members that are to be held together by the keybolt. With the free end of the keybolt extended through the apertures the key member is movable rotationally and traversly in the recess into a locked position. In the locked position the key member extends perpendicular to the longitudinal axis of the bolt member. In the locked position the key member prevents the bolt member from passing out of the apertures and disengaging the members that are being held together by the keybolt.

BRIEF DESCRIPTION OF THE DRAWING

FIG. 1 is an end cross sectional view of a first embodiment of the keybolt of the present invention shown in a locked position.

FIG. 2 is a side view of the keybolt shown in FIG. 1.

FIG. 3 is a front view of the keybolt shown in FIG. 1.

FIG. 4 is an end view of the keybolt shown in FIG. 1 with the key member moved to an unlocked position.

FIG. 6 is an end view of the bolt member shown in FIG. 5 with the key member in a locked position.

FIG. 7 is an end view similar to FIG. 6 with the key member shown moved to an unlocked position.

FIG. 8 is the end view of an alternative embodiment of the keybolt of the present invention shown with the key member thereof moved to an unlocked position.

FIG. 9 is an end view of the keybolt shown in FIG. 8 shown with the key member thereof moved to a locked position.

FIG. 10 is a side view of the bolt member and key member shown in FIG. 8.

FIG. 11 is a side view of the bolt member and key member shown in FIG. 9.

BEST MODES FOR CARRYING OUT INVENTION

Figure 5:
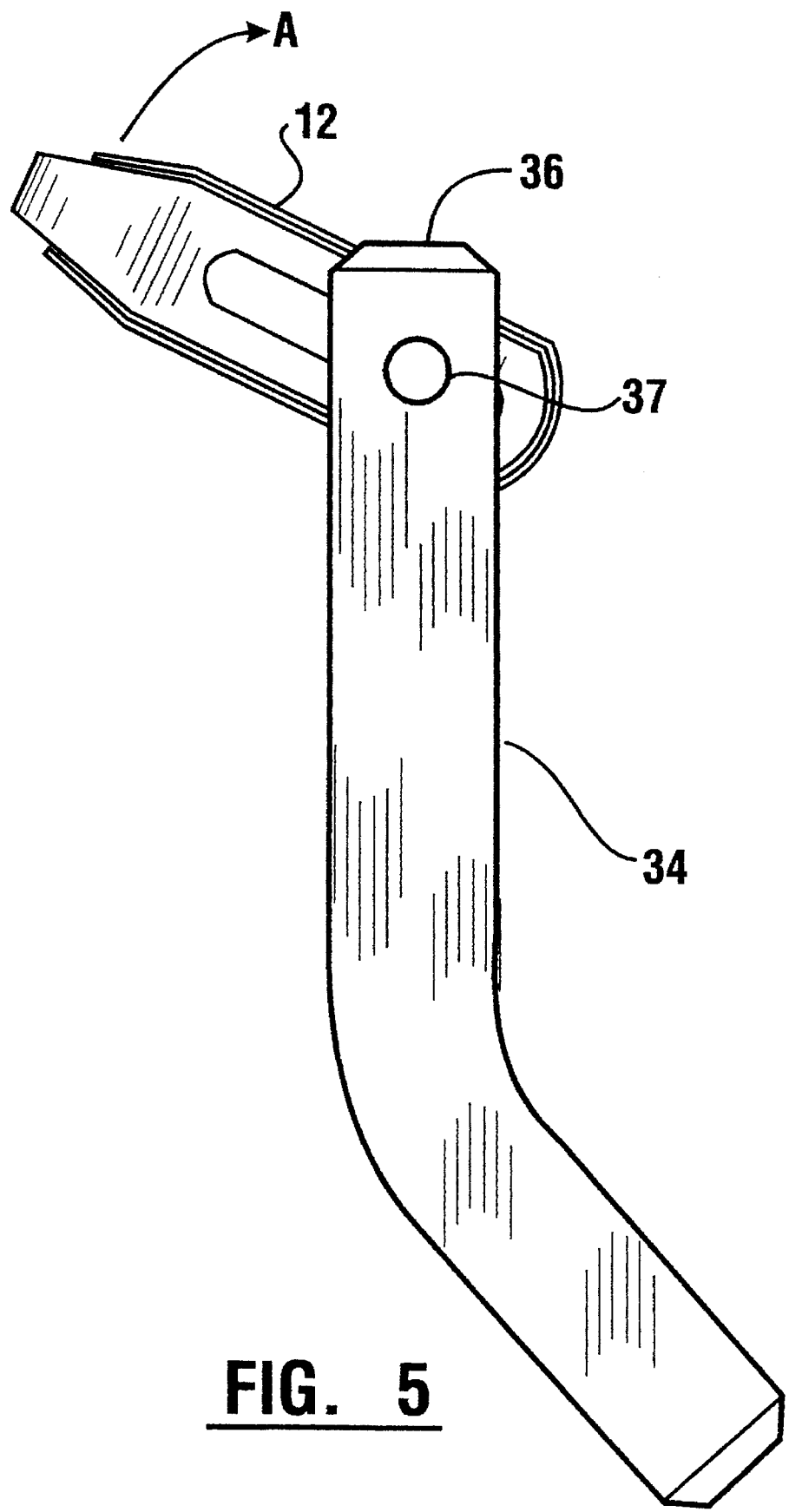
FIG. 5 is a front view of a further alternative embodiment of the keybolt of the present invention including the key member of the embodiment shown in FIG. 1.

Referring now to the drawings and particularly to FIGS. 1 through 4 there is shown therein a first embodiment of a keybolt 40 of the present invention. The keybolt includes a bolt member 10 having a bolt head 32 at an end thereof. The head 32 is adapted for preventing the passage of the bolt member 30 entirely through apertures in members that the keybolt is used to temporarily fasten together.

The bolt member 10 has a recess 20 therein adjacent a first end 38 which is a free end oppositely disposed from head 32. The recess 20 is bounded by a longitudinally extending face surface 17 and a radially extending land surface 27. The face surface 17 is bounded by side edges 23 wherein the face surface meets the cylindrical outer surface of the bolt member.

An elongated U-shaped key member 12 is slidably and rotatably mounted on the bolt member in the recess 20. The key member has a first leg 22 and second leg 24. Both legs 22 and 24 terminate at an open end 18 of the key member. The legs 22 and 24 are joined together at a closed end 16 of the key member. The leg portions of the key member are formed to provide spring action so that the legs are biased apart at the open end.

Each leg 22 and 24 has a closed elongated channel 42 extending therethrough. The elongated channel is bounded on each side by side walls 26. A rivet 14 traversely extends in recess 20 from the bolt member and passes through the channels 42 in the legs. The rivet includes a head 13 which holds the key member on the bolt member. The rivet enables the key member to slidably and rotatably move on the bolt member in the recess.

The key member 12 is movable to an unlocked position which is shown in FIG. 4. In this position the key member may be rotated about the rivet 14 so that the closed end of the key member extends outwardly along the centerline of the bolt member. This enables the keybolt to be inserted or removed from appropriately sized apertures in members that are held temporarily together by the keybolt.

The key member is also movable from the unlocked position of the key member shown in FIG. 4 to a locked position. The locked position is reached by extending the key member perpendicular to the centerline of the bolt member 10 and sliding the key member traversely to the position shown in FIG. 3. The key member 12 is held in this position by biasing action of the legs. In this locked position the key member prevents the bolt member from passing out of the apertures and thus serves to hold the members through which the keybolt extends in connected relation.

The side walls 26 bounding the channel 42 of first leg 22 each include a step 21. Each step extends in a direction traverse and generally away from the second leg portion 24. In the locked position of the key member the steps 21 are abuttingly engageable with an adjacent one of the side edges 23 of the face surface 17. This abutting relationship along with the biasing force exerted by the legs tends to hold the key member in the locked position.

The first leg 22 is yieldable against the biasing force to a position so that the steps 21 can pass into the recess 20. This enables the key member to be moved to the unlocked position as shown in FIG. 4 from the locked position shown in FIG. 1. From the position shown in FIG. 4 the key member may be rotated ninety degrees to a position wherein the closed end 16 extends directly outward along the longitudinal axis of the bolt member wherein the keybolt may be readily inserted or removed from appropriately sized apertures. Alternatively, the key member may be rotated one hundred eighty degrees which enables the open end 18 of the legs to be positioned on a desired side of the bolt member. This facilitates placing the open end of the key member in a position where it may be readily manually engaged.

When the key member is in the unlocked position shown in FIG. 4 and is rotated, the open end 18 of the key member is within the recess. This enables the open end 18 to move past land surface 27 of the bolt member as the key member is rotated. However, once the key member is moved to extend ninety degrees from the longitudinal axis of the bolt member and is slid traversely to the position shown in FIG. 3, steps 21 hold the open end of the key member sufficiently outward that substantial rotation of the key member is prevented.

First leg 24 includes a U-shaped flange 30 about its periphery. Flange 30 is optimally sized for accepting first leg 22 therein when the legs are compressed together for purposes of moving the key member to the unlocked position. Flange 30 also provides added strength to the key member. This additional strength enables the key member to resist loads that may be applied in the longitudinal direction along the bolt member so as to maintain members connected by the keybolt together. The flange member 30 may be as wide as desired by the expected loading and the geometry of the bolt member and recess will permit.

The key member 12 is shown mounted in an alternative embodiment of the invention in FIGS. 5 through 7. In this alternative embodiment the key member is mounted on a bolt member 34 which has a generally dog-leg shape. The dog-leg shape of member 34 prevents passage of the bolt member through apertures similar to head 32 in the previously described embodiment. Bolt number 34 has a first end 36 which includes a rivet 37 that extends therethrough. The first end 36 includes a u-shaped recess 28 which is bounded by two prongs 29. The key member 12 functions in the manner of the previously described embodiment except that a land surface extends across the interior of the recess 28 between the prongs. This alternative design has advantages in that the rivet is protected from damage by its position inside the prongs.

Another alternative embodiment of the invention is shown in FIGS. 8 through 11. This embodiment includes a bolt member 50 which may include a head similar to the embodiments shown in FIGS. 1 through 4, or they have a dog-leg shape similar to the embodiment shown in FIG. 5. The bolt member 50 at its free end includes a recess 52. Recess 52 is positioned in centered relation of the free end of bolt number 50 such that it divides the free end of the bolt member into two prongs 54. Each of the prongs includes a flat face surface 56 which bounds the recess 52. Each face surface terminates at side edges 58 where the face surfaces meet the outer cylindrical surface of the bolt member 50.

An alternative key member 60 is mounted in recess 52. Key member 60 includes a first leg member 62 and second leg member 64. Leg members 62 and 64 are connected at a closed circular end 66 and are biased apart at an open end 68. Each of the leg members 62 and 64 include an elongated channel therethrough similar to the elongated channels of the first embodiment. A rivet 70 extends between the prongs 54 and across the recess 52. The rivet extends through the elongated channel in the leg members 62 and 64.

Leg member 62 includes a turned portion 72 adjacent the open end 68. Turned portion 72 is generally dish-shaped in cross section as shown in FIGS. 10 and 11. Turned portion 72 further includes a pair of steps 74. As shown in FIGS. 8–9 the step 74 are hook shaped and are adapted for engaging the side edges 58 of the adjacent face surface 56.

The recess 52 is bounded by a land surface 76 which extends between the prongs 54. In the unlocked position of the key member shown in FIG. 8 the open end 68 of the key member is enabled to rotate past the land surface such that the closed end 66 of the key member may be aligned longitudinally with the axis of the bolt member. This enables the keybolt to be inserted into apertures in members to be connected by the keybolt.

Once the keybolt has been inserted through apertures in the members to be connected, the key member may be rotated to the position shown in FIG. 8 and then moved traversely to a locking position shown in FIG. 9. In this position the key member prevents the bolt member from being retracted out of the apertures. In addition, the hook shaped steps 74 prevent the key member from moving to the unlocked position and helps to secure the keybolt. The turned portion 72 of the key member 60 also adds strength to resist longitudinal forces that may be applied thereon by the members through which the keybolt is inserted.

As in the case with the previously described embodiments the open end 68 of the key member may be selectively positioned on either side of the bolt member. This facilitates positioning the open end of the key member in the optimal position for manual engagement. Also, once the key member 60 is in the locking position shown in FIG. 9 the enlarged closed end 66 as well as the edges of the land surface 76 bounding the recess 52 serve to prevent rotation of the key member and hold it in the locked position.

Although the preferred embodiment of the invention is used in keybolts, it will be understood that the present invention may be used with other types of fasteners or linkages in which it is desired to lock a fastener in an aperture.

Thus, the keybolt of the present invention achieves the above-stated objectives, eliminates difficulties encountered in the use of prior devices and systems, solves problems, and attains the desirable results described herein.

In the foregoing description certain terms have been used for brevity, clarity, and understanding, however no unnecessary limitations are to be implied therefrom because such terms are for descriptive purposes and are intended to be broadly construed. Moreover, the descriptions and illustrations given are by way of examples and the invention is not limited to the exact details shown and described.

Having the described the features, discoveries, and principles of the invention, the manner in which it is constructed and utilized, and the advantages and useful results attained; the new and useful structures, devices, elements, arrangements, parts, combinations, systems, equipment and operations and relationships are set forth in the appended claims.

We claim:

1. A Keybolt comprising:

a bolt member having a first end;

a key member movably mounted on said bolt member at said first end wherein said key member is movable in both a longitudinal and rotational direction on said bolt member, and wherein said key member includes a pair of legs, each of said legs having an elongated channel therein, and wherein said bolt member includes a recess at said first end and wherein said keybolt further comprises a rivet member mounted on said bolt member, said rivet member extending in said recess and through each channel of said key member.

2. A Keybolt comprising:

a bolt member having a first end;

a key member movably mounted on said bolt member at said first end, wherein said key member is movable in both a longitudinal and rotational direction on said bolt member, wherein said key member is generally u-shaped in cross section, and wherein said key member includes two spaced legs, said legs being separated and biased apart at a first end and joined together at a second end.

3. The keybolt according to claim 2 wherein said legs each include an elongated channel therethrough and wherein said bolt member includes a recess at said first end, and wherein said keybolt further comprises a rivet member mounted traversely on said bolt member, said rivet member extending through each of said elongated channels, said key member movably mounted in said recess on said rivet member.

4. A keybolt according to claim 3 wherein at least one of said leg members includes a step thereon and wherein said recess comprises a face surface having side edges and wherein in the locked position of said key member, said step is abuttingly engagable with an adjacent one of said side edges.

5. A keybolt comprising:

a bolt member having a key receiving recess at one end thereof;

a u-shaped key member having two spaced legs, each said leg having an elongated channel therethrough;

a member traversely extending across said recess and passing traversely through said elongated channels in each said leg member to retain said key member within said slot, wherein said key member is slidable and rotatable on said bolt member to an unlocked position wherein said key member extends outwardly and coaxially with said bolt member, and alternatively to a locked position wherein said key member extends normal of said longitudinal axis of said bolt member.

6. The keybolt according to claim 5 wherein at least one of said leg members includes a step, and wherein said recess includes a face surface bounded by an edge, and wherein in the locked position said step abuttingly engages said edge.

* * * * *